IMAGE MOTION DETECTOR

Filed Jan. 24, 1968 2 Sheets-Sheet 1

Philip A. Shaffer, Jr.,
INVENTOR.
BY.
GOLOVE & KLEINBERG,
ATTORNEYS.

Philip A. Shaffer, Jr.,
INVENTOR.
BY.
GOLOVE & KLEINBERG,
ATTORNEYS.

3,537,793
Patented Nov. 3, 1970

3,537,793

IMAGE MOTION DETECTOR

Philip A. Shaffer, Jr., Pasadena, Calif., assignor to Hycon Mfg. Company, Monrovia, Calif.

Filed Jan. 24, 1968, Ser. No. 700,303
Int. Cl. G01p 3/36
U.S. Cl. 356—28 12 Claims

ABSTRACT OF THE DISCLOSURE

An improved apparatus for detecting the velocity of moving optical images, and for stabilizing images. Electronic means are utilized for imparting apparent translational velocity to a spatial filter without actual movement of the spatial filter, effectively heterodyning a generated high frequency reference signal with an image velocity signal. Phase rate detection techniques are utilized for isolating the image velocity information from the heterodyned signal.

This invention relates to apparatus for detecting the velocity of unstabilized optical images, for stabilizing optical images, and for analyzing image velocity for extracting information useful in aeronautical navigation.

The present invention comprises an improvement upon an image motion detector and stabilizer disclosed in the U.S. patent application of Murray J. Hillman, Ser. No. 612,448, filed Jan. 30, 1967, and assigned to the assignee herein. In the Hillman apparatus, an image signal is heterodyned with a high frequency carrier signal corresponding to a generated reference signal, and an electrical signal representative of image velocity is ultimately generated by comparing the rate of phase variation of the heterodyned signal with respect to the phase of the reference signal. The resulting image velocity signal can be utilized in a servo loop for image stabilization, and for providing a compensating signal to image motion compensation systems of aerial cameras for synchronizing camera film motion with image motion during film exposure intervals. In addition, the image velocity signal may be utilized for other applications which utilize image velocity data, such as respecting areronautical navigation.

The Hillman patent application teaches apparatus which includes an optico-electrical transducer, for heterodyning the image signal with the carrier signal, and for generating an electrical composite signal having a composite frequency including an image frequency component corresponding to the velocity of the moving image and a carrier frequency component, and for generating an electrical reference signal having a frequency corresponding to the carrier frequency component of the composite signal. These two output signals from the optico-electrical transducer are then compared by phase lock techniques, for generating the image velocity signal.

Both the present invention and the Hillman apparatus utilize the well-known phenomenon that if an image moves over a spatial filter, such as a grid having alternate transparent and opaque bands transverse to the direction of the image instability, the transmitted light energy fluctuates in time at a rate proportional to the product of image velocity and the grid wave number. As applied to aerial imagery, for example the alternating opaque and transparent bands of the optical grid can be situated in a direction transverse to the direction of aircraft flight, so that an image of the relatively moving ground target is projected upon the plate and traverses the grid parallel to the flight direction. The transmitted optical signals impinge upon a photoelectrical device to produce an electrical signal which varies in amplitude at a temporal frequency proportional to image velocity, and includes a DC component which corrosponds to scene illumination and a sinusoidal type component having a frequency proportional to image velocity.

In prior art image velocity sensors utilizing a stationary grid, the electrical signal which is produced is characterized by very low frequencies, often less than one cycle per second, in addition to having properties of bandwidth limited noise. In order to determine the frequency of the signal, it is necessary to average the frequency over many cycles to provide a mean frequency which is accurately representative of image velocity. The more cycles used in the averaging process, of course, the closer this mean frequency will approach a value accurately representative of image velocity. It can be seen that, in the apparatus described above, several seconds will be required to provide a mean frequency determined over only a few cycles. Accordingly, image motion sensors utilizing merely the fixed grid are characterized by long response times, and their dynamic performance is quite limited. Further, such prior art apparatus yields only absolute values of velocity, producing unacceptable results when the instantaneous image velocity becomes negative.

As taught by the Hillman invention, if the bands of the optical grid are caused to move parallel to the direction of image motion, many cycles of the temporal frequency in the electrical signal will be available for processing in a very short period of time. In a preferred embodiment of the Hillman apparatus, a disc having alternating opaque and transparent sectors contained thereon is rotated, intercepting the image in the plane of rotation, to produce a composite electrical signal which includes a constant frequency carrier component corresponding to the velocity of the grid, in addition to a frequency component corresponding to instantaneous image velocity. The rapidly moving grid may be considered to be a time compressor with respect to the image velocity, and the great increase in frequency attendant thereto makes available a greatly increased number of cycles in a short period of time. The independent velocity of the grid has in effect supplied a new reference to the temporal frequency corresponding to image velocity. An electrical reference signal is generated by providing a stationary light source impinging upon a photoelectric device with the moving grid interposed therebetween, producing a reference signal having a frequency corresponding to the velocity of the grid. The output signals of the Hillman optico-electrical transducer are the composite signal and the reference signal, and the rate at which the reference signal must be advanced to coincide in phase with the composite signal is proportional to the image velocity.

The present invention teaches alternative apparatus for implementing the electro-optical transducer portion of the Hillman apparatus, in order to generate the above described composite and reference signals, without utilizing physical movement of the optical grid structure. Electronic means are provided for imparting apparent translational velocity to an optical grid structure, supplying a time compressor function with respect to the image velocity without actual grid movement.

The present invention utilizes a pair of spatial filters, such as optical grids of identical size and structure, positioned in the image plane. Means are provided for splitting the image in order to produce therefrom two images which are of identical size and brightness. Each image is caused to traverse a different one of the grids, but the two images are displaced from each other in a direction at right angles to the grid bands by one-quarter cycle of grid pattern.

For example, a moving target may be imaged by means of a lens and a pair of optical wedges, which focus an image on each of the two grids which are quadrately displaced from one another, i.e. by one-quarter cycle of grid pattern. The fluctuations in signal intensity occur with the same frequency but are displaced 90° with respect to each other.

The photometric signals emanating from each grid is supplied to a separate photodetector, and the AC signals generated therefrom are applied to separate preamplifiers. The preamplifier output signals each have a frequency corresponding to the product of the grid wave number and the image velocity, but are in phase "quadrature" (or separated in phase from each other by $\pm 90°$), and can be described as cosine and sine waves, respectively.

A reference signal generator is provided for generating a second pair of signals having a predetermined reference frequency substantially greater than the frequency corresponding to image velocity, but also in phase quadrature. For example, a reference frequency oscillator can be provided to produce a cosine wave signal having a predetermined reference frequency, and the oscillator output signal can be applied to a phase shifter for providing a quadrature phase shift, such as one producing a 270° phase lag (or 90° phase lead) to generate a signal having a negative sine waveform at the predetermined reference frequency.

Means are provided for taking the product of the two cosine type signals, and for taking the product of the two sine type signals. A first product output is therefore generated which is composed of two side bands, one side band having a frequency equal to the sum of the reference and image frequencies, while the other side band has a frequency equal to the difference between the reference and image frequencies. The second product signal is also composed of the same sum and difference frequencies, but the difference frequency component is a negative value. The two product signals are thereupon applied to a means for taking their arithmetic sum, with the result that the difference frequency components are cancelled in the summer output signal.

The summer output signal, therefore, has a composite frequency which includes the reference frequency and a frequency which is proportional to image velocity. A reference frequency signal is also supplied at the reference frequency oscillator output.

The composite signal and the reference signal are applied to a phase rate detection means, as described in the Hillman patent application, the output of which can be a voltage signal whose magnitude is proportional to image speed and whose sense is indicative of image velocity direction.

It is an object of the present invention to provide improved apparatus for detecting motion of an optical image.

It is another object of the present invention to provide improved apparatus for rendering an optical image motionless.

It is a further object of the present invention to provide an improved optico-electrical transducer for utilization in an image motion detector.

It is yet another object of the present invention to provide apparatus for imparting apparent translational velocity to a spatial filter without physical movement thereof.

The novel features which are believed to be characteristic of the invention, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

Figure 1:
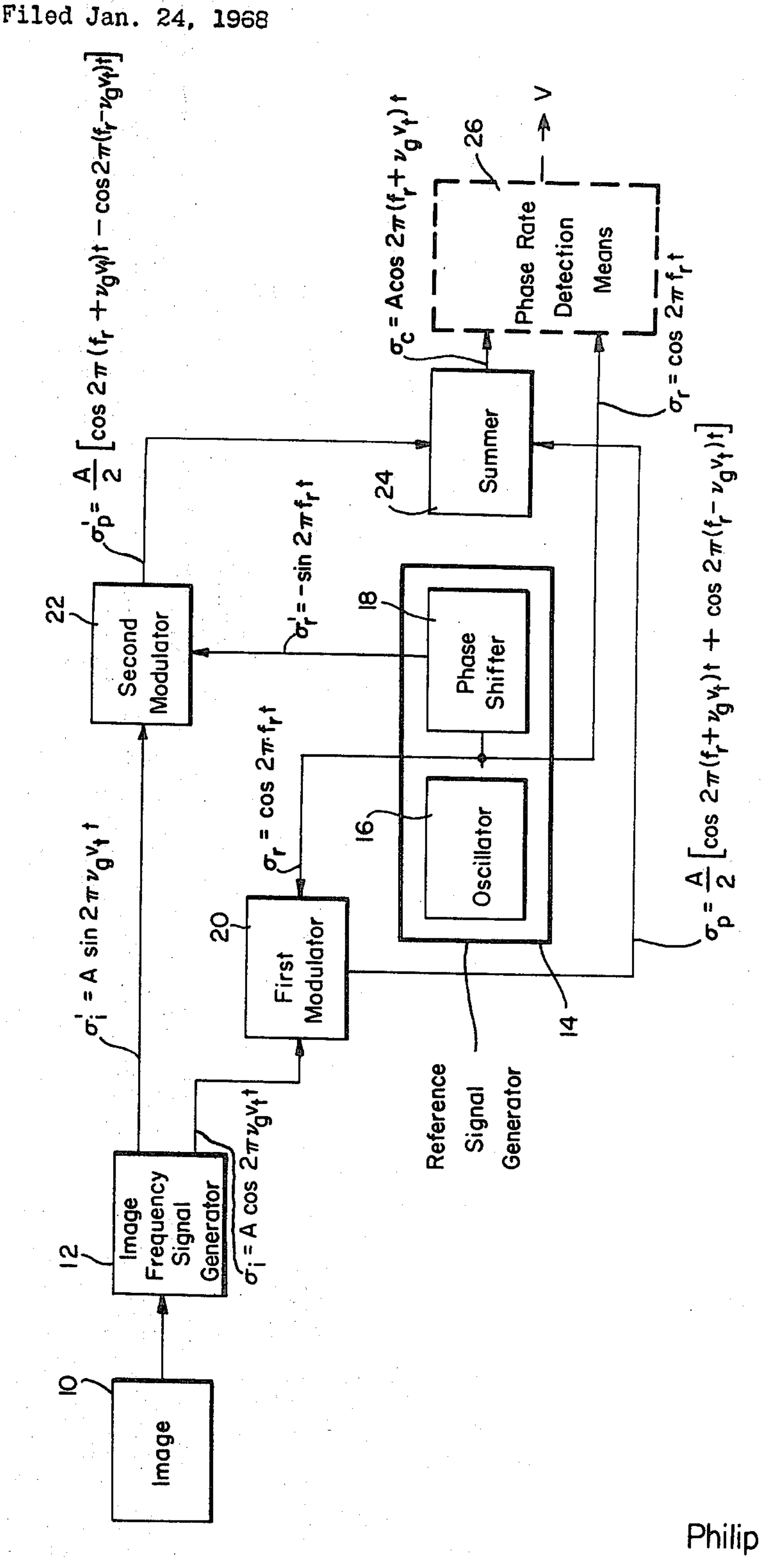
FIG. 1 is a block diagram of an optico-electrical transducer according to the present invention.

Turning first to FIG. 1, an image 10 which exhibits a velocity having components in two mutually perpendicular directions is applied to an image frequency signal generator 12. The image frequency signal generator 12 generates a pair of electrical AC signals $\sigma_i$, $\sigma_i'$, each having a frequency proportional to the velocity of the applied image in a particular direction over a predetermined image plane. The phase of the second signal $\sigma_i'$, however, is in quadrature with the phase of the first signal $\sigma_i$.

Although the image frequency signal generator 12 is more fully described below with respect to FIGS. 2 and 3, it should be mentioned for the purpose of the present discussion that the image frequency signal generator 12 includes a pair of spatial filters, or optical grids, positioned in the image plane for generating photometric signals each having a temporal frequency corresponding to image velocity in the direction transverse to the grids. The grids are displaced relative to one another by one-quarter cycle of grid pattern to produce the quadrature phase separation of the image frequency signals $\sigma_i$, $\sigma_i'$. The first and second image frequency signals $\sigma_i$, $\sigma_i'$ can be cosine and sine functions, respectively, of the grid wave number and the transverse image velocity in the image plane. Accordingly, $$\sigma_i = A \cos 2\pi \nu_g v_t t$$

and $$\sigma_i' = A \sin 2\pi \nu_g v_t t$$

where $\nu_g$ is the grid wave number (cycles per inch), $v_t$ is the transverse image velocity in the plane of the grids (inches per second), $t$ is time, and the amplitude A is dependent upon the grid wave number $\nu_g$.

A reference signal generator 14 is provided, for generating a pair of signals each having a predetermined reference frequency substantially greater than the frequency of the image frequency signals $\sigma_i$, $\sigma_i'$ corresponding to image velocity. The selection of the reference frequency is not critical, but would commonly be 10 to 30 kilocycles per second.

The reference signal generator 14, for example, can include a reference frequency oscillator 16 for generating a first reference signal $\sigma_r$ which is a cosinusoidal function of the reference frequency. The oscillator output can be applied to a phase shifter 18 for generating a second reference signal $\sigma_r'$ having a frequency identical to that of the first reference signal $\sigma_r$ but separated in phase therefrom by an amount identical in magnitude to the phase separation of the image frequency signals $\sigma_i$, $\sigma_i'$. An appropriate phase shifter 18 is one which produces a 90° phase lead. Accordingly, $$\sigma_r = \cos 2\pi f_r t$$

and $$\sigma_r = \cos 2\pi f_r t$$

where $f_r$ is the predetermined reference frequency.

The first image frequency signal $\sigma_i$ and the first reference signal $\sigma_r$ are thereupon applied as inputs to a first modulator 20 for multiplying the input signals, to produce as an input a first product signal $\sigma_p$ having two side bands. The first of the side bands has a frequency equal to the sum of the reference and image frequencies, while the other side band has a frequency equal to the difference between the reference and the image frequencies.

Similarly, the second image frequency signal $\sigma_i'$ and the second reference signal $\sigma_r'$ are applied as inputs to a second modulator for multiplying its input signals to generate a second product signal $\sigma_p'$ having two side bands. The first of these side bands has a frequency equal to the sum of the reference and image frequencies, while the second has a frequency equal to the difference between the reference and image frequencies. The difference frequency side band of the second product signal $\sigma_p'$, however, is opposite in sign with respect to the other side bands. Accordingly, $$\sigma_p=\frac{A}{2}[\cos 2\pi(f_r+\nu_g v_t t)+\cos 2\pi(f_r-\nu_g v_t)t]$$

and $$\sigma_p'=\frac{A}{2}[\cos 2\pi(f_r+\nu_g v_t t)-\cos 2\pi(f_r-\nu_g v_t)t]$$

The product signals $\sigma_p$, $\sigma_p'$ are applied as inputs to a summer 24, which performs a linear summation upon the summer input signals. The first side bands of the product signals $\sigma_p$, $\sigma_p'$ (representing the summation frequency) reinforce each other, while the second side bands (representing the difference frequency) cancel each other. Accordingly, the summer output signal is a composite signal $\sigma_c$ having a composite frequency which is the sum of the reference frequency and the image velocity frequency; that is, $$\sigma_c=A\cos 2\pi(f_r+\nu_g v_t)t$$

The signal outputs of the optico-electrical transducer of the present invention is the composite signal $\sigma_c$ and the first reference signal $\sigma_r$, the latter signal being taken from the output of the reference frequency oscillator 16. The electrical output signals $\sigma_c$, $\sigma_r$ can be applied as inputs to a phase rate detection means 26, for detecting the rate at which the first reference signal $\sigma_r$ must be advanced in phase to coincide with the composite signal $\sigma_c$. The detected rate is proportional to image velocity, and the output of the phase rate detection means can be a voltage signal V having a magnitude proportional to the detected image speed and a sense indicative of image velocity direction. Appropriate phase rate detection apparatus is described in the prior referenced Hillman patent application.

Figure 2:
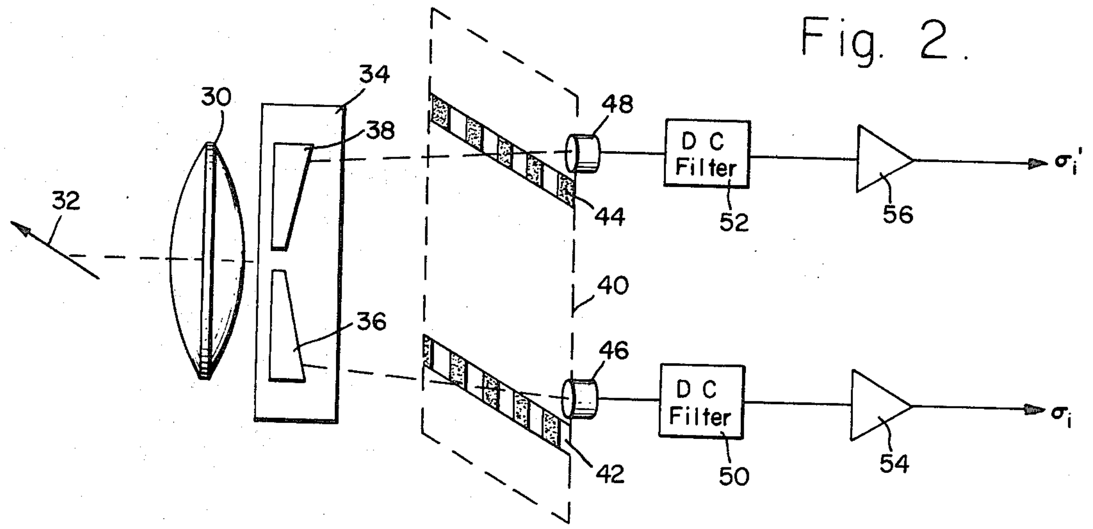
FIG. 2 is a part perspective, part block diagram of a preferred mechanization of the image frequency signal generator shown in FIG. 1.

Turning now to FIG. 2, there is shown a preferred mechanization of the image frequency signal generator 12 of FIG. 1, in combination with imaging means such as a lens 30 which provides a spatial image of a target 32. The target 32 can be a portion of "moving" terrain when the apparatus is carried by an aircraft; alternately, the target 32 can be a real or a virtual image exhibiting motion in at least one direction.

Image separation means 34 is interposed in the image path for separating the image which would otherwise be produced by the lens 30 into a pair of images of substantially identical size and brightness. The image separation means 34 can include, for example a pair of identical optical wedges 36, 38, positioned in the image path, for separating the image provided by the lens 30 into the two substantially identical images focused on an image plane 40.

A pair of identical spatial filters, such as a first optical grid 42 and a second optical grid 44 are each positioned in the image plane 40 to intercept a different one of the two identical images. Further, each image traverses its respective grid such that the direction of the image motion component of interest is perpendicular to the grid bands.

In order to produce the 90° phase separation in the grid temporal output signals, the two grids 42, 44 are displaced by one-quarter cycle of grid pattern as prior discussed. Alternatively, the phase separation can be accomplished within the image separation means 34, by causing the two identical images on the image plane 40 to be displaced by an amount equal to one-quarter cycle of the grid pattern.

Each of the photometric signals emanating from the grids 42, 44, is applied to one of a pair of photodetectors 46, 48. The photodetectors 46, 48 should have as nearly identical input-output characteristics as possible.

The electrical signal generated by each of the photodetectors 46, 48 includes an AC signal which fluctuates about a varying DC signal corresponding to scene illumination. The extraction of the image velocity information from the AC signals is facilitated by removal of the DC terms from the photodetector output signals allowing the AC signals to fluctuate about a zero value (i.e., the average value of each of AC terms is zero). DC filter means 50, 52 are therefore provided for removing the DC terms from each of the detector output signals. The AC signals are thereupon applied to respective preamplifiers 54, 56 each having a frequency response extending from zero cycles per second to an upper limit of at least the highest contemplated frequency derived from the product of the grid wave number and image velocity, $\nu_g v_t$. The output signals of the preamplifiers 54 56 are the image frequency signals $\sigma_i$, $\sigma_i'$ respectively, in phase quadrature.

Figure 3:
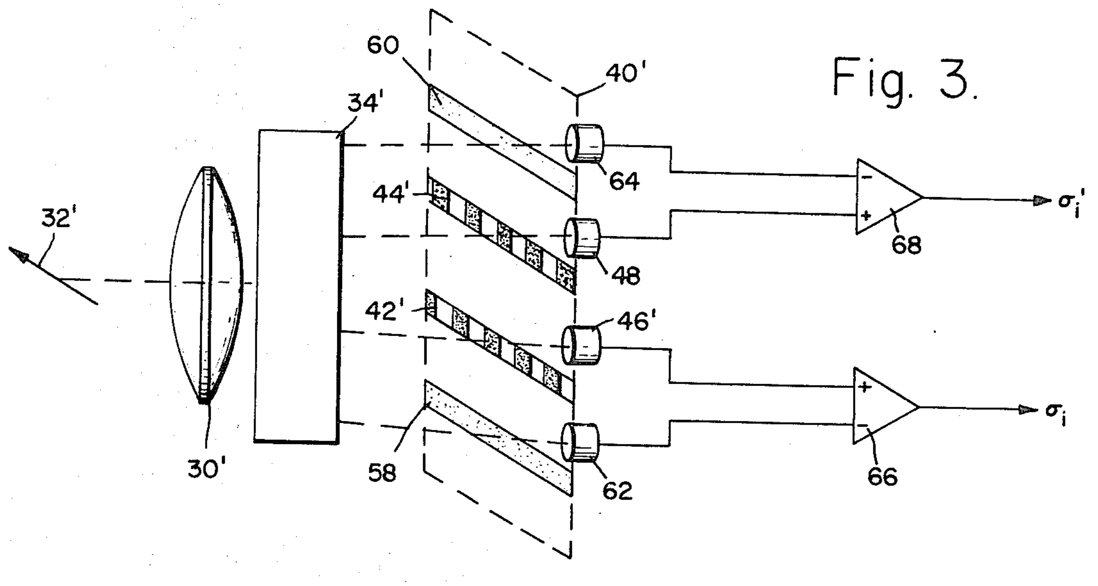
FIG. 3 is a part perspective, part block diagram of an alternative mechanization of the image frequency signal generator shown in FIG. 1.

Turning to FIG. 3, there is shown an alternative mechanization of the image frequency signal generator 12 of FIG. 1, in combination with a lens 30' for providing a spatial image of a target 30'. Primed reference numerals are utilized in FIG. 3 to indicate components similar to those of FIG. 2, including similarity of operation with the exception that the image separation means 34' operates to produce four images of substantially identical size and brightness from the spatial image signal applied thereto by the lens 30'.

The importance of the alternative mechanization of FIG. 3 concerns the manner by which the DC terms are removed from the photodetector output signals. A pair of identical translucent members 58, 60, having dimensions substantially identical to those of the grids 42', 44', are each positioned in the image plane 40' to intercept a different one of the four identical images. The two translucent members 58, 60 are selected such that their light transmittance is equal to the transmittance of the grids 42', 44'. For example, if the opaque and transparent bands of the grids 42', 44' are of equal width, the grids will transmit 50% of the received light to their respective photodetectors 46', 48'. The amount of transmitted light produces the DC currents in the photodetector output signals. In this example, therefore, the opaque members 58 ,60 provide 50% transmittance of the received light to their respective photodetectors 62, 64, which generate DC output signals corresponding to the DC terms of the grid-photodetector output signals.

The electrical output signal from the first grid-photodetector 46' is applied to a positive terminal of a first differencing amplifier 66, while the output signal of the first translucent member-photodetector 62 is applied to a negative terminal of the first differencing amplifier 66. Accordingly, the first image frequency signal $\sigma_i$ is produced as an output of the first differencing amplifier 66.

Similarly, the output signal of the second grid-photodetector 48' is applied to a positive input terminal of a second differencing amplifier 68, and the output signal of the second translucent member-photodetector 64 is applied to a negative input terminal of the second differencing amplifier 68, producing the second image frequency signal $\sigma_i'$ as an output.

Thus, there has been described apparatus for imparting apparent translational velocity to a spatial filter without actual movement thereof. Apparatus according to the present invention has particular application in combination with phase rate detection equipment as disclosed in the prior referenced Hillman patent application. When so utilized, said apparatus comprises the optico-electrical transducer portion of equipment for detecting the velocity of unstabilized optical images, for stabilizing optical images, and for analyzing image velocity for extracting information useful in aeronautical navigation.

Other embodiments of apparatus according to the present invention and modifications of the embodiment and mechanizations herein presented may be developed without departing from the essential characteristics thereof. Accordingly, the invention should be limited only by the scope of the claims appended below.

What is claimed as new is:

1. In a device for detecting velocity of an optical image, apparatus for providing signals related to the velocity of the image, comprising the combination of:

(a) spatial filter means for intercepting the image;

(b) transducer means for receiving the intercepted image and for generating first and second signals therefrom, each having a frequency corresponding to image velocity and in phase quadrature with one another;

(c) reference means for generating a reference signal having a reference frequency substantially greater than the frequency of said first and second signals; and (d) processing means coupled to said transducer means and reference means for processing said first and second signals and said reference signal for generating a composite signal having a composite frequency including said reference frequency and the frequency of said first and second signals.

2. The apparatus according to claim 1, above, further including second processing means adapted to have said composite and reference signals applied thereto as inputs for generating an output signal having magnitude and since representative of image veloicty.

3. In a device for detecting velocity of an optical image, the combination comprising:

(a) separation means for receiving the image to produce a plurality of substantially identical, separated images therefrom;

(b) spatial filter means positioned to intercept said separated images;

(c) transducer means positioned to receive the intercepted separated images for generating first and second signals therefrom having a first frequency corresponding to image velocity and in phase quadrature with one another;

(d) reference means for generating a reference signal having a reference frequency substantially greater than said first frequency; and (e) processing means coupled to said transducer and reference means for generating from said first, second and reference signals, a composite signal having a composite frequency including said reference frequency and said first frequency.

4. The apparatus according to claim 3, above, further including phase detector means adapted to have said composite and reference signals applied thereto as inputs, for generating a detector output signal having magnitude and sense representative of image velocity.

5. In a device for detecting velocity of an optical image, apparatus for generating a composite signal having a frequency including an image frequency component corresponding to velocity of the image and a reference frequency component, comprising the combination of:

(a) first means in the optical path for generating a first signal having a frequency corresponding to image velocity, and for generating a second signal having a frequency corresponding to image velocity and in phase quadrature with said first signal;

(b) second means for generating a third signal having a reference frequency substantially greater than the frequency corresponding to image velocity, and for generating a fourth signal having said reference frequency and in phase quadrature with said third signal;

(c) a third means coupled to said first and second means and adapted to receive said first and third electrical signals, for generating a fifth signal corresponding to the product of said first and third signals;

(d) fourth means coupled to said first and second means and adapted to receive said second and fourth signals, for generating a sixth signal corresponding to the product of said second and fourth signals; and (e) fifth means coupled to said third and fourth means and adapted to receive said fifth and sixth signals, for generating a seventh signal corresponding to the sum of said fifth and sixth signals, said seventh signal having a frequency corresponding to the sum of the frequencies of said first and third electrical signals.

6. The apparatus according to claim 5, above, further including sixth means coupled to said second and fifth means and adapted to receive said third and seventh signals, for comparing the frequencies of said third and seventh signals and for generating an output signal having magnitude and sense representative of image velocity.

7. In a device for detecting velocity of an optical image at an image plane, apparatus for generating a first velocity signal having a frequency corresponding to image velocity and for generating a second velocity signal having a frequency corresponding to image velocity and in phase quadrature with said first velocity signal, comprising the combination of:

(a) separation means in the optical path of the image for separating said image into first and second substantially identical images;

(b) first transducer means in the optical path of said first separated image;

(c) second transducer means in the optical path of said second separated image;

(d) first spatial filter means interposed between said separation means and said first transducer means, said first spatial filter means intercepting said first separated image; and (e) second spatial filter means interposed between said separation means and said second transducer means, said second spatial filter means intercepting said second separated image and quadrately displaced with respect to said first spatial filter means.

8. The apparatus according to claim 7, above, further including means for removing DC components from said first and second velocity signals.

9. The apparatus according to claim 8, above, further including:

(a) reference signal generating means for generating a first reference signal having a reference frequency substantially greater than the frequency corresponding to image velocity, and for generating a second reference signal having said reference frequency but in phase quadrature with said first reference signal;

(b) first modulator means adapted to have said first velocity signal and said first reference signal applied thereto as inputs, for generating a first modulator output signal corresponding to the product of said first velocity signal and said first reference signal;

(c) second modulator means adapted to have said second velocity signal and said second reference signal applied thereto as inputs, for generating a second modulator output signal corresponding to the product of said second velocity signal and said reference signal; and (d) summing means adapted to have said first and second modulator output signals applied thereto, for generating a composite signal corresponding to the sum of said first and second modulator output signals, said composite signal having a composite frequency including an image frequency component corresponding to image velocity and a reference frequency component corresponding to said reference frequency.

10. The apparatus according to claim 9, above, wherein said second velocity signal lags said first velocity signal by 90°, and said second reference signal leads said first reference signal by 90°.

11. The apparatus according to claim 9, above, further including phase detector means adapted to have said composite signal and said first reference signal applied thereto as inputs for generating a detector output signal having magnitude and sense representative of image velocity.

12. In a device for detecting velocity of an optical image at an image plane, apparatus for generating a first velocity signal having a frequency corresponding to image velocity and for generating a second velocity signal having a frequency corresponding to image velocity and in phase quadrature with said first velocity signal, comprising the combination of:

(a) separation means in the optical path of the image for separating said image into first, second, third and fourth substantially identical images;

(b) first transducer means in the optical path of said first separated image, for generating a first transducer output signal;

(c) second transducer means in the optical path of said second separated image, for generating a second transducer output signal;

(d) third transducer means in the optical path of said third separated image, for generating a third transducer output signal;

(e) fourth transducer means in the optical path of said fourth separated image, for generating a fourth transducer output signal;

(f) first spatial filter means interposed between said separation means and said first transducer means, said first spatial filter means intercepting said first separated image;

(g) second spatial filter means interposed between said separation means and said second transducer means, said second spatial filter means intercepting said second separated image and quadrately displaced with respect to said first spatial filter means;

(h) first translucent means interposed between said separation means and said third transducer means, said first translucent means intercepting said third separated image for altering the illumination of said third transducer means to correspond to the illumination of said first transducer means;

(i) second translucent means interposed between said separation means and said fourth transducer means, said second translucent means intercepting said fourth separated image for altering the illumination of said fourth transducer means to correspond to the illumination of said second transducer means;

(j) first differencing means coupled to said first and third transducer means, for eliminating a component in said first transducer output signal to generate the first velocity signal; and (k) second differencing means coupled to said second and fourth photoelectric transducer means, for eliminating a component in said second transducer output signal to generate the second velocity signal.

References Cited

UNITED STATES PATENTS

| | | | |
|---|---|---|---|
| 3,372,278 | 3/1968 | Aemmer | 250—83.3 |
| 3,351,768 | 11/1967 | Cooke | 250—220 X |
| 3,227,888 | 11/1966 | Shepherd | 250—220 X |
| 3,001,081 | 9/1961 | Bower | 250—220 X |
| 2,142,378 | 1/1939 | Sachtleben | 250—220 |

RODNEY D. BENNETT, Jr., Primary Examiner

J. G. BAXTER, Assistant Examiner

U.S. Cl. X.R.

250—220